United States Patent
Kammler et al.

[11] Patent Number: 5,966,909
[45] Date of Patent: Oct. 19, 1999

[54] PACKAGING MACHINE

[75] Inventors: Roman Kammler, Worms; Walter Baur, Gruendau, both of Germany

[73] Assignee: Rovema Verpackungsmaschinen GmbH, Fernwald, Germany

[21] Appl. No.: 09/018,381

[22] Filed: Feb. 4, 1998

[30] Foreign Application Priority Data

Feb. 5, 1997 [DE] Germany ............................ 197 04 169

[51] Int. Cl.⁶ ............................ B65B 9/12; B65B 51/14
[52] U.S. Cl. ............................ 53/552; 53/550; 53/374.5
[58] Field of Search ............................ 53/551, 550, 221, 53/552, 373.7, 374.3, 374.5; 156/69; 219/552, 553

[56] References Cited

U.S. PATENT DOCUMENTS

| | | | |
|---|---|---|---|
| 3,778,588 | 12/1973 | Bishel . | |
| 3,905,174 | 9/1975 | Heisler | 53/485 |
| 4,807,426 | 2/1989 | Smith | 53/551 |
| 4,968,867 | 11/1990 | Banzai et al. | 219/69.12 |
| 5,056,296 | 10/1991 | Ross et al. | 53/478 |
| 5,279,098 | 1/1994 | Fukuda | 53/551 |
| 5,379,574 | 1/1995 | Fischer et al. | 53/222 |
| 5,551,206 | 9/1996 | Fukuda | 53/551 |
| 5,571,370 | 11/1996 | Selberg et al. | 53/375.9 X |

*Primary Examiner*—Linda Johnson
*Attorney, Agent, or Firm*—Flynn, Thiel, Boutell & Tanis, P.C.

[57] ABSTRACT

In a packaging machine 2 with a movable part 27, which can be moved toward a packaging 26 or a product to be packaged, and a carrier movable with the part 27 and connected to the part 27, the part 27 and/or the carrier consists of a magnesium alloy 28, for example Mg Ag3 Se2 Zr1 or Mg A19 Zn1. A magnesium alloy 28 has low mass, low moment of inertia, high capability to conduct heat, high heat capacity and good stiffness. It can also be used for heated, package-building elements, for example, a longitudinal sealing jaw 33 movable toward a foil tube 6, a cross-sealing jaw 16, 17 or a cutting knife 25. Relatively small forces are needed for moving a part 27 and/or a carrier 23 consisting of a magnesium alloy 28, which makes the packaging machine 2 less expensive to operate.

13 Claims, 3 Drawing Sheets

PACKAGING MACHINE

FIELD OF THE INVENTION

The invention relates to a packaging machine including a movable part movable toward a packaging material or a product to be packaged and a carrier connected to the part for moving the part.

BACKGROUND OF THE INVENTION

Movable parts and their carriers on packaging machines are generally made of steel. Steel is suitable for both heated parts, for example welding systems for the plastic welding, and for non-heated parts, for example folding devices for folding boxes or carriers for folding devices.

The stiffness (elasticity module: $20 \times 10^{10}$ N/m$^2$) of steel speaks positively for its use in the manufacturing of a movable part or its carrier. Due to its relatively high values for the specific heat conductivity (15 to 45 W/m·K) and the specific heat capacity (0.4 to 0.5 kJ/kg·K), steel is used in welding units.

Steel has the disadvantage that it is relatively heavy (density: 6.3 to 8.1 kg/dm$^3$), and thus relatively great masses must be accelerated in the packaging machines. This results in large-mass parts and carriers, for which high driving forces must be produced. The high moments of inertia of steel are also disadvantageous in high performance packaging machines, in which very high accelerations must occur.

Plastics as parts or carriers would indeed have low moments of inertia due to their relatively low densities, however, with reference to their stiffness they do not meet the demands made by movable parts or carriers. Plastics cannot be utilized for parts to be heated because of their comparatively low heat conductivity.

The basic purpose of the invention is to improve the movable parts or their carriers on a packaging machine with another material, whereby the material is intended to clearly have a lesser density than steel. The stiffness of the material must be sufficient. In addition, the material is intended to have very good values for the specific heat conductivity and the specific heat capacity in order to be able to use it also for parts to be heated, and to thus have to store only one single material for both parts to be heated and parts not to be heated.

SUMMARY OF THE INVENTION

The purpose is attained by providing a packaging machine including a carrier having a part thereof moveable toward the packaging. The movable part and/or the carrier of the movable part consists accordingly of a magnesium alloy.

The magnesium alloy is relatively light and the mass moments of inertia and the accelerating forces are thus reduced. Its density of 1.7 kg/dm$^3$ is clearly lower than the density of steel (6.3 to 8.1 kg/dm$^3$) so that relatively large volume parts or carriers can be accelerated quickly and with relatively little input. This is particularly advantageous for high-performance packaging machines. By reducing the accelerating forces, the driving mechanism becomes simpler and the packaging machine less expensive.

The stiffness of the magnesium alloy is $4.4 \times 10^{10}$ N/m$^2$ and is thus sufficient for the needs of manufacturing packaging machines.

The specific heat conductivity of the magnesium alloy is clearly higher with 170 W/m·K than the one of steel (15 to 45 W/m·K). The specific heat capacity of the magnesium alloy (1 kJ/kg·K) is clearly more than the specific heat capacity of steel (0.4 to 0.5 kJ/kg·K). Thus the magnesium alloy can also be easily used for heated parts of a packaging machine.

By using the magnesium alloy for both parts to be heated and also parts not to be heated or rather carriers, one single material is needed and stored for parts and carriers. In addition, the magnesium alloy has a Brinell hardness (HB) of 200 to 300 which is relatively hard.

The packaging machine of the invention has additional advantages.

If the magnesium alloy has a coating and the coating is chemically inert, then a protection of the magnesium alloy against chemically aggressive substances is achieved. These aggressive substances could be the products to be packaged.

A reliable protection of the magnesium alloy exists when the same is anodized.

Of a particular advantage is the magnesium alloy for a cross-sealing jaw of a vertical or horizontal tubular bagging machine and its carriers. The cross-sealing jaw can be moved by means of the carrier toward a foil tube to be cross-welded. The thereby required accelerating forces are clearly reduced through the use of the magnesium alloy. Because of its high heat conductivity and heat capacity, the magnesium alloy is advantageous for the heat-operated cross-sealing jaw. The cross-sealing jaw does not show any significant temperature differences along its sealing surface and heat dissipations are quickly balanced along the jaw.

The same is true for a longitudinal sealing jaw, which is movable toward a foil tube to be longitudinally welded. More specifically, the accelerating forces are reduced and the temperature operation is improved in the longitudinal sealing jaw.

In addition, a cross-sealing jaw can be designed longer and can still have a reduced in size and output driving mechanism and smaller drive force requirements.

The inertia forces during the movement of the cross-sealing jaws are reduced further if a cutting knife provided in the cross-sealing jaw and used for separating the foil tube consists of a magnesium alloy.

For parts of the packaging machines, which become hot, as for example the cross-sealing jaw, the longitudinal sealing jaw or the cutting knife, Mg Ag3 Se2 Zr1 is particularly suited as the magnesium alloy. This alloy contains 3% silver, 2% selenium and 1% zirconium, and is also identified as an MSR-alloy. It is heatresistant up to approximately 300 degrees celsius and has the herein described characteristics of a magnesium alloy.

The magnesium alloy Mg Al9 Zn1 containing 9% aluminum and 1% zinc is suited for both the moved parts and also their carriers. The magnesium alloy Mg Al9 Zn1 meets very well all initially described characteristics of a part made of magnesium alloy and is easily available.

The magnesium alloy is inexpensive to manufacture as a cast part.

The relatively low inertia moment of a magnesium alloy is particularly advantageous for use in quickly moving parts or their carriers, as for example in two rotating jaw systems, which are movable opposite to one another, and whereby each jaw system has at least one cross-sealing jaw and one carrier. Particularly high packaging speeds can be achieved through the continuous movement of the cross-sealing jaws.

The mechanical characteristics of the magnesium alloy also provide improved results when used in a carton producing machine (herein cartoner), i.e. a packaging machine producing cartons. The improvements in the cartoner are the same as those in a movable part of a product-feeding device or a collecting packer and the possibility of using larger parts therein which nevertheless can be moved with little mechanical input.

In an advantageous embodiment, the cartoner has a die as a moving part, which can be moved toward a carton blank and together with the carton blank through a mold. If the die is manufactured of a magnesium alloy, then it is sufficiently inherently strong and can be moved back and forth with little mechanical input to form each carton blank during a forward movement in the mold.

BRIEF DESCRIPTION OF THE DRAWINGS

The invention will be discussed in greater detail hereinafter in connection with the figures illustrating exemplary embodiments, in which.

DETAILED DESCRIPTION

Figure 1:
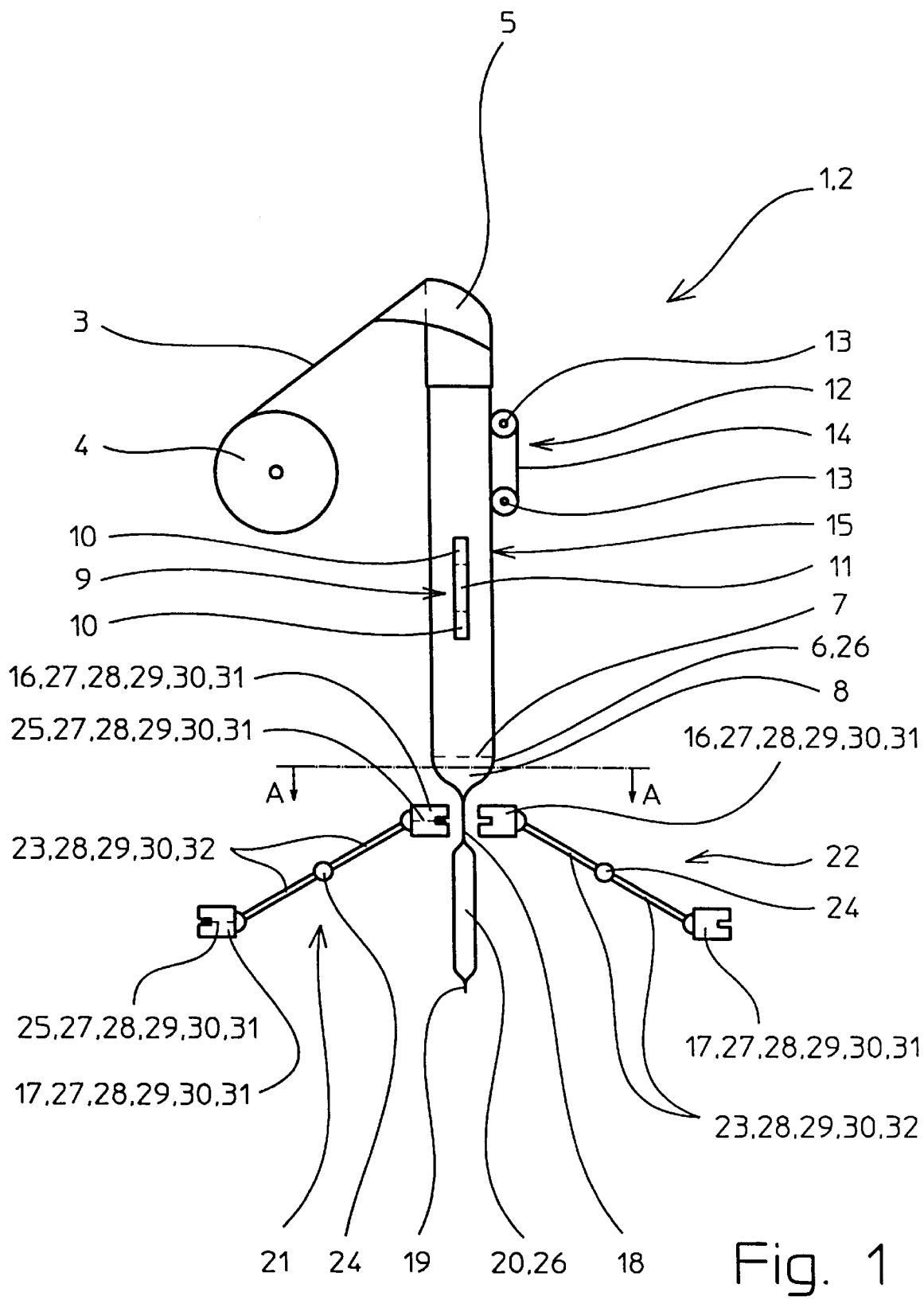
FIG. 1 is a side view and a principle illustration of a vertical tubular bagging machine with a foil strip unwound from a storage roller, a forming shoulder for forming the flat foil strip around a fill pipe into a foil tube, a foil-transporting device for the further transport of the foil strip and the foil tube, a longitudinal sealing device, and cross-sealing jaws movable against one another and rotatable about axes.

A foil strip 3 is unwound from a storage roller 4 in a packaging machine shown as a vertical tubular bagging machine and is formed on a forming shoulder 5 into a foil tube 6 (FIG. 1). The foil tube 6 encloses a fill pipe 7, through which the lower end 8 of the foil tube 6 is filled. The foil strip 3 and the foil tube 6 are continuously moved onwardly by means of a foil-transporting device 9 which acts against the foil tube 6. The foil-transporting device 9 has two drive belts 11 each rotating around two rollers 10 for contact against the foil tube to move the foil tube 6 downwardly as shown in FIG. 1.

A longitudinal sealing device 12 has a sealing band 14 rotating around two wheels 13 for sealing the foil strip into the foil tube 6. The band 14 continuously longitudinally welds the foil strip producing a longitudinal sealing seam 15.

Figure 2:
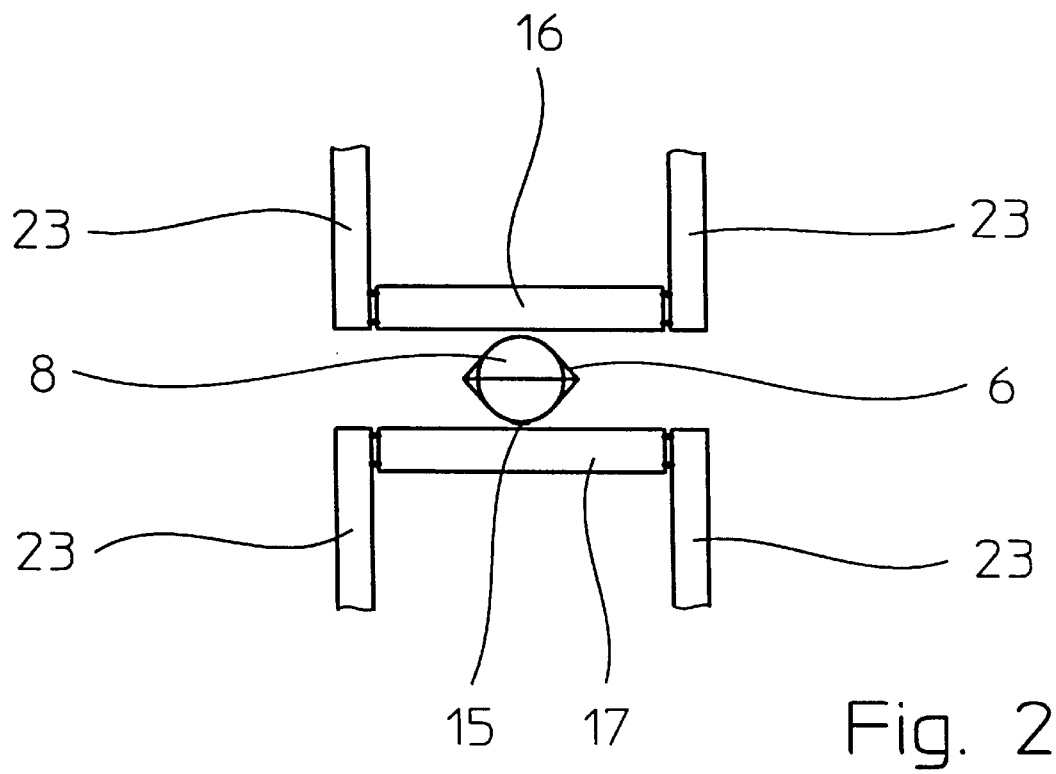
FIG. 2 is a top view with a horizontal cross-sectional view taken along A—A of FIG. 1 showing the lower end of the foil tube and a detailed partial sketch of the rotating jaw systems.

Cross welding of the foil tube 6 occurs after a filling operation by means of cross-sealing jaws 16, 17, whereby a head seam 18 and a bottom seam 19 of a tubular bag 20 are created. Two rotating jaw systems 21, 22 are provided. Each jaw system 21, 22 has two cross-sealing jaws 16, 17 and a carrier 23 per each cross-sealing jaw 16, 17 (FIG. 2). Carriers 23 and cross-sealing jaws 16, 17 can be rotated about axes 24.

A cutting knife 25 for separating a foil bag 20 from the foil tube 6 is provided in the cross-sealing jaws 16, 17 of one of the jaw systems, here shown in jaw system 21.

The foil tube 6 is used as packaging 26 for a product. The cross-sealing jaws 16, 17 and the cutting knives 25 can be moved as movable parts 27 toward and against the packaging 26.

The cross-sealing jaws 16, 17 are manufactured of a magnesium alloy 28 as are the carriers 23 supporting the cross-sealing jaws 16, 17 and the cutting knives 25, i.e. the movable parts. The magnesium alloy 28 is anodized and is thus surrounded by a chemically inert coating 29 to protect the carriers, jaws and cutting knives.

The movable parts 27 and the carriers 23 are cast parts 30. Whereas the heated parts 27 are manufactured of Mg Ag3 Se2 Zr1 indicated as reference number 31 in FIG. 1 as a magnesium alloy 28, the magnesium alloy having the formula Mg Al9 Zn1 indicated as reference number 32 was chosen for the carriers 23.

In comparison to steel, both magnesium alloys 31, 32 have a clearly lower density, and have thus clearly lower weights and mass moments of inertia. The parts 27 and the carriers 23 can thus be moved with a reduced mechanical energy input. The parts 27 and the carriers 23 have sufficient stiffness for their use in packaging machines. The parts 27 are sufficiently heat-resistant for the packaging operation, and have both a high heat conductivity and a high heat capacity, which results in an easily reproducible, safe and quick welding of the top seams 18 and bottom seams 19. The materials 31, 32 could also be exchanged for one another.

Figure 3:
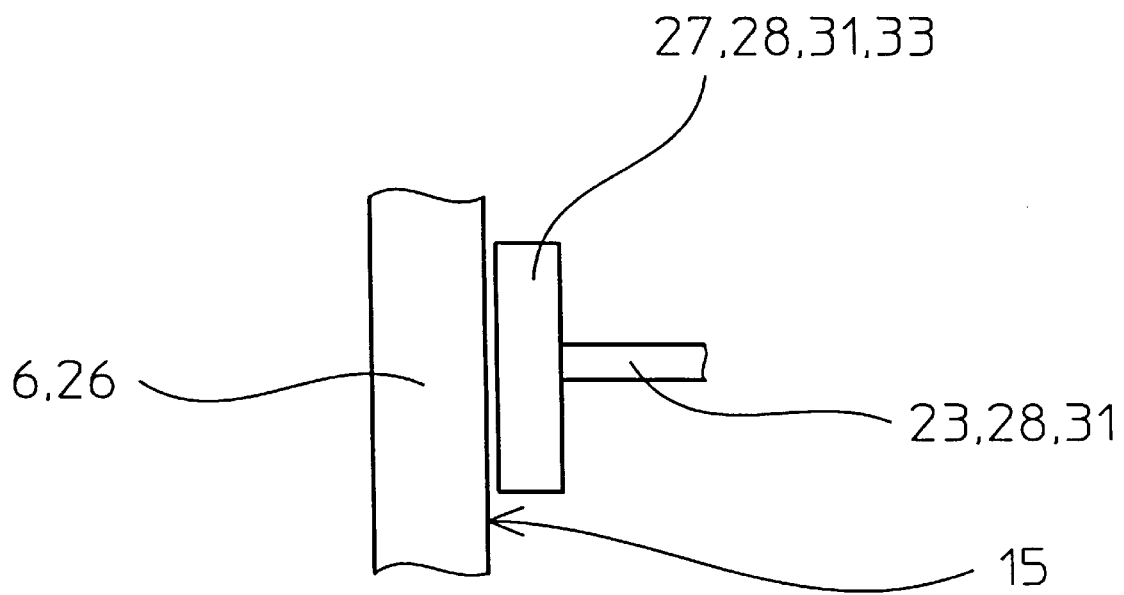
FIG. 3 is a side illustration and a section of a longitudinal sealing jaw movable toward a foil tube.

The movable part 27 is in a further exemplary embodiment (FIG. 3) a longitudinal sealing jaw 33, which can be moved for the creation of a longitudinal sealing seam 15 by means of a carrier 23 toward a foil strip to be welded longitudinally into a foil tube 6. The longitudinal-sealing jaw 33 and the carrier 23 consist of the magnesium alloy 28 having a formula Mg Ag3 Se2 Zr1 designated as 31 and are not additionally coated.

Figure 4:
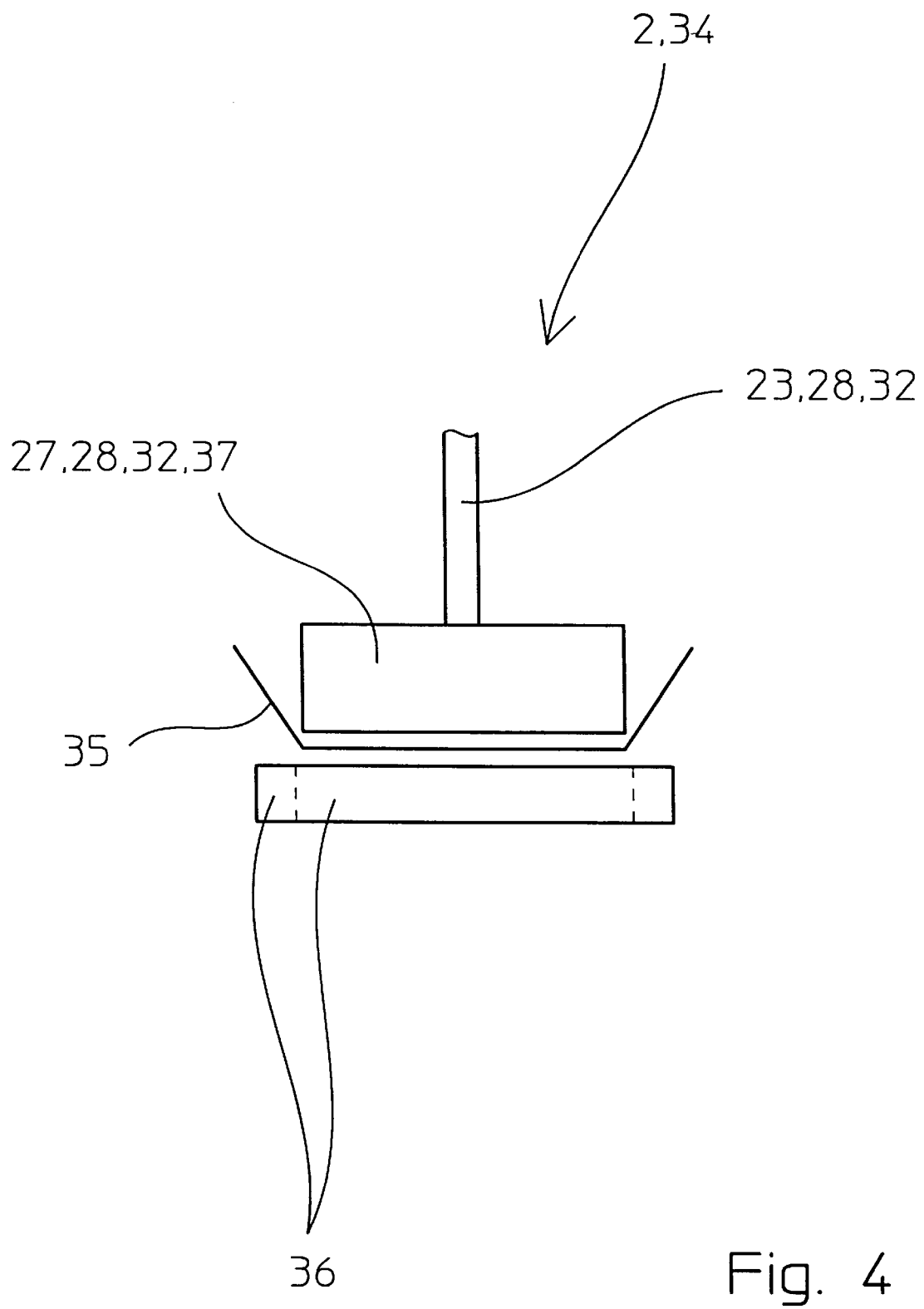
FIG. 4 is a side illustration of the die of a cartoner, which can be moved toward a carton blank and a mold.

The packaging machine 2 is a cartoner 34 in the exemplary embodiment of FIG. 4. The cartoner 34 has a die 37 as the movable part 27, which can be moved toward a carton blank 35 and together with the carton blank 35 through a mold 36. The die 37 and its carrier 23 are manufactured out of a magnesium alloy having the formula of Mg Al9 Zn1 designated as 32 and are not coated.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A packaging machine, comprising means for creating individual, product receiving packages from a continuous packaging strip, said means including means for forming the packaging strip into a packaging tube, means for moving the packaging tube, a movable cross-sealing jaw movable toward the packaging tube for cross heat sealing the packaging tube so as to heat seal an individual package end, and a carrier connected to the cross-sealing jaw for moving the cross-sealing jaw into contact with the packaging tube, and the cross-sealing jaw consisting of a magnesium alloy Mg Ag3 Se2 Zr1.

2. The packaging machine according to claim 1, wherein the magnesium alloy is provided with a coating, and the coating is chemically inert.

3. The device according to claim 2, wherein the magnesium alloy is anodized.

4. The packaging machine according to claim 1, wherein the cross-sealing jaw is in a vertical tubular bagging machine, said carrier moving said cross-sealing jaw toward a foil packaging tube to be transversely welded.

5. A packaging machine, comprising means for creating individual, product receiving packages from a continuous packaging strip, said means including means for forming the packaging strip into a packaging tube, means for moving the packaging tube, a movable cross-sealing jaw movable toward the packaging tube for cross heat sealing the packaging tube so as to heat seal an individual package end, and a carrier connected to the cross-sealing jaw for moving the cross-sealing jaw into contact with the packaging tube, said cross sealing jaw being made of a magnesium alloy, and the longitudinal-sealing jaw consisting of a magnesium alloy Mg Ag3 Se2 Zr1.

6. The packaging machine according to claim 5, wherein the means for forming includes a longitudinal sealing jaw of a vertical tubular bagging machine for longitudinally sealing a foil packaging tube, the longitudinal sealing jaw is made of a magnesium alloy, and a second carrier moves said longitudinal sealing jaw toward a foil packaging tube to be longitudinally welded for the creation of a longitudinal sealing seam.

7. The packaging machine according to claim 1, wherein the cross-sealing jaw has a cutting knife, the cutting knife being extendable from the cross-sealing jaw.

8. A packaging machine, comprising means for creating individual, product receiving packages from a continuous packaging strip, said means including means for forming the packaging strip into a packaging tube, means for moving the packaging tube, a movable cross-sealing jaw movable toward the packaging tube for cross heat sealing the packaging tube so as to heat seal an individual package end, and a carrier connected to the cross-sealing jaw for moving the cross-sealing jaw into contact with the packaging tube, said cross sealing jaw being made of a magnesium alloy, and one of the cross-sealing jaw and the carrier being a magnesium alloy consisting of Mg Al9 Zn1.

9. The packaging device according to claim 1, wherein one of the cross-sealing jaw and the carrier is a cast part.

10. The packaging machine according to claim 1, wherein two rotating jaw systems are provided, which are oppositely movable, and each jaw system has at least one cross-sealing jaw and one carrier.

11. The packaging machine according to claim 8, wherein the packaging machine is a horizontal tubular bagging machine.

12. A packaging machine, comprising a storage roller storing a foil strip thereon, a forming shoulder for forming a foil tube from the foil strip, a fill pipe around which the foil tube is positioned and through which product is inserted into the foil tube, a foil transporting device acting against the foil tube to continuously move the foil strip and foil tube, a heated sealing jaw for transversely welding the foil tube to create an end of an individual product containing package, said heated sealing jaw being made of a magnesium alloy, said magnesium alloy, heated sealing jaw having a composition of 3% silver, 2% selenium, 1% zirconium, and the remainder being magnesium.

13. A packaging machine, comprising a storage roller storing a foil strip thereon, a forming shoulder for forming a foil tube from the foil strip, a fill pipe around which the foil tube is positioned and through which product is inserted into the foil tube, a foil transporting device acting against the foil tube to continuously move the foil strip and foil tube, a heated sealing jaw for transversely welding the foil tube to create an end of an individual product containing package, said heated sealing jaw being made of a magnesium alloy, said magnesium alloy, heated sealing jaw having a composition of 9% aluminum, 1% zinc, and the remainder being magnesium.

* * * * *